United States Patent [19]
Miyata et al.

[11] Patent Number: 5,043,645
[45] Date of Patent: Aug. 27, 1991

[54] NC STATEMENT PREPARING SYSTEM

[75] Inventors: Mitsuto Miyata; Yukihito Nagaoka, both of Hachioji; Tomotaka Moriyama, Hino, all of Japan

[73] Assignee: Fanuc Ltd, Japan

[21] Appl. No.: 425,185

[22] PCT Filed: Feb. 16, 1989

[86] PCT No.: PCT/JP89/00158

§ 371 Date: Oct. 16, 1989

§ 102(e) Date: Oct. 16, 1989

[87] PCT Pub. No.: WO89/08290

PCT Pub. Date: Sep. 8, 1989

[30] Foreign Application Priority Data

Mar. 1, 1988 [JP] Japan .................. 63-047899

[51] Int. Cl.$^5$ .............................. G06F 15/46
[52] U.S. Cl. .................... 318/571; 318/574; 318/572; 364/474.22; 364/474.17
[58] Field of Search ................. 318/560-579; 364/191, 474.16, 474.17, 474.18, 474.19, 474.20, 474.25, 474.21, 474.22, 474.32, 474.34, 474.35; 83/256, 279, 289, 291, 301, 406.1, 411.5, 411.1, 411.3

[56] References Cited

U.S. PATENT DOCUMENTS

| | | | |
|---|---|---|---|
| 4,131,837 | 12/1978 | Whetham | 318/571 |
| 4,497,029 | 1/1985 | Kiyokawa | 318/572 X |
| 4,549,270 | 10/1985 | Fukumura et al. | 364/474.21 |
| 4,631,465 | 12/1986 | Fukuyama et al. | 318/565 |
| 4,639,855 | 1/1987 | Sekikawa | 364/474.22 X |
| 4,644,460 | 2/1987 | Kishi et al. | 364/474.22 X |
| 4,680,719 | 7/1987 | Kishi et al. | 364/474.32 X |
| 4,742,470 | 5/1988 | Juengel | 364/474.17 |
| 4,748,554 | 5/1988 | Gebauer et al. | 364/474.17 |
| 4,776,247 | 10/1988 | Kiya | 318/574 X |
| 4,855,898 | 8/1989 | Kawamura et al. | 364/474.22 X |

Primary Examiner—Paul Ip
Attorney, Agent, or Firm—Staas & Halsey

[57] ABSTRACT

An NC statement preparing system of an interactive numerical control device. Whether a tool (2) is a one-way cutting tool or a tool capable of multi-directional cutting is determined, and an NC statement is prepared by choosing between an NC statement composed of a tool passage for the one-way cutting tool and an NC statement composed of a tool passage for the multi-directional cutting. Accordingly, a machining program for a short machining time can be prepared.

2 Claims, 4 Drawing Sheets

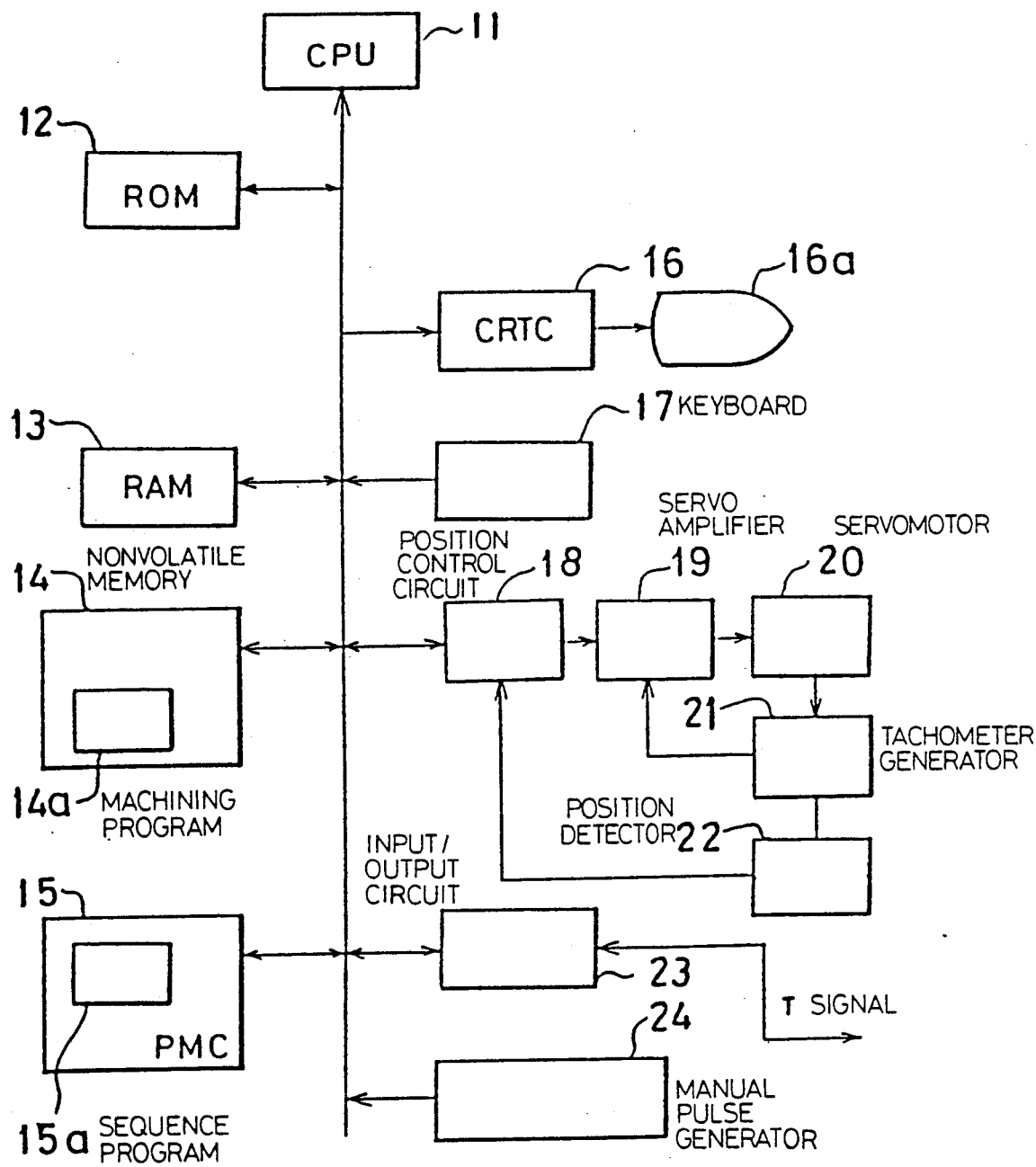
F I G. 3

NC STATEMENT PREPARING SYSTEM

TECHNICAL FIELD

The present invention relates to an NC statement preparing system of an interactive numerical control device, and more particularly, to an NC statement preparing system in which an NC statement for the use of a tool capable of multi-directional cutting can be prepared.

BACKGROUND ART

In an interactive numerical control device, when cutting a region which must be cut several times by a turning tool, the tool is usually manufactured with an edge on only one side thereof Accordingly, the cutting is made always in one direction, and the tool is operated so that it is returned to a machining start point by a rapid traverse after the cutting.

FIG. 4 shows an example of a passage of a conventional machining program. In FIG. 4, numerals 1 and 3 denote a workpiece and a tool for one-way cutting, respectively. The axes of abscissa and ordinate represent the coordinate Z- and X-axes, respectively. As shown in FIG. 4, a passage for the tool 3 is made in the order P1, P2, P3, P4, P5, P6. In the tool passage, the full line indicates cutting, and the broken line indicates a rapid traverse.

When using this machining passage, however, if the tool is a turning tool capable of multi-directional cutting, the tool is often moved unnecessarily, thus prolonging the machining time and requiring a long NC statement.

SUMMARY OF THE INVENTION

The present invention has been contrived in consideration of the above circumstances, and an object thereof is to provide an NC statement preparing system in which an NC statement for the use of a tool capable of multi-directional cutting can be prepared.

To solve the above problem, according to the present invention, there is provided an NC statement preparing system which is characterized by comprising a means for preparing an interactive program, a discriminating means for determining whether a tool is a one-way cutting tool or a tool capable of multi-directional cutting, and an NC statement preparing means for preparing an NC statement by choosing between an NC statement composed of a tool passage for the one-way cutting tool and an NC statement composed of a tool passage for the multi-directional cutting, in an NC statement preparing system of an interactive numerical control device.

The tool capable of multi-directional cutting has cutting edges in both directions and can cut in a plurality of directions, and a machining passage can be chosen in consideration of this point.

Thus, it is determined whether the tool is a one-way cutting tool or a tool capable of multi-directional cutting, and if the tool is capable of multi-directional cutting, a machining passage for exclusive use is selected.

BRIEF DESCRIPTION OF THE DRAWINGS

FIG. 3 is a block diagram of hardware for effecting the present and invention.

DESCRIPTION OF THE PREFERRED EMBODIMENT

One embodiment of the present invention will now be described with reference to the accompanying drawings.

Figure 1:
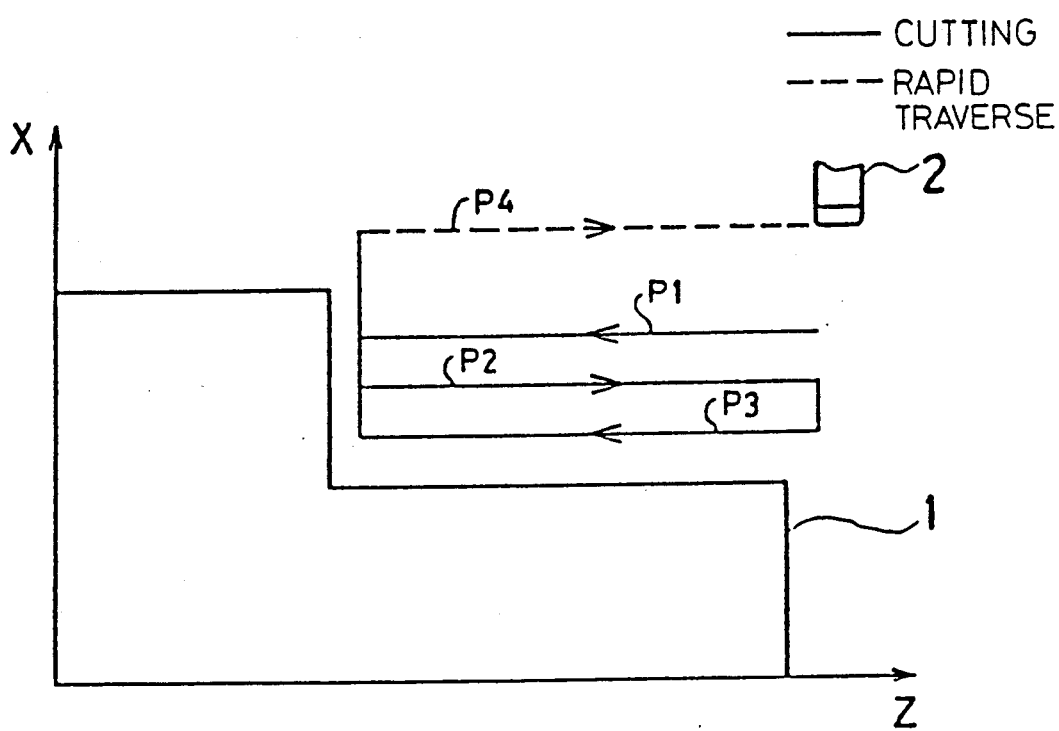
FIG. 1 is a diagram showing a passage for a bi-directional tool.
Figure 4:
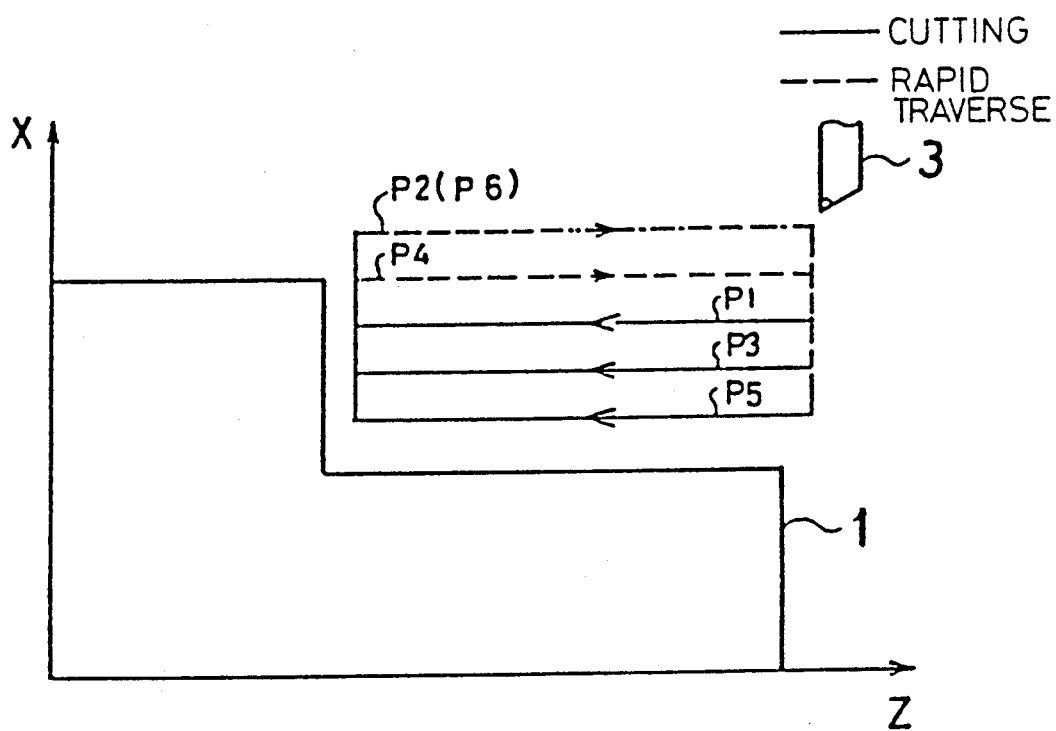
FIG. 4 is a diagram showing an example of a passage of a prior art machining program.

FIG. 1 shows a passage for a tool which is capable of multi-directional cutting. In FIG. 1, numeral 1 denotes a workpiece, and numeral 2 denotes the tool having cutting edges on both the right and left sides thereof. and thus capable of multi-directional cutting. The axes of the abscissa and ordinate represent the Z-and X-axes, respectively. As shown in FIG. 1, the tool advances successively through passage sections P1, P2, P3, and P4, and in contrast with the arrangement of FIG. 4, there is no extra passage, whereby the machining time is reduced and the NC statement is shortened. In the machining passage, the full line indicates cutting, and the broken line indicates a rapid traverse.

Figure 2:
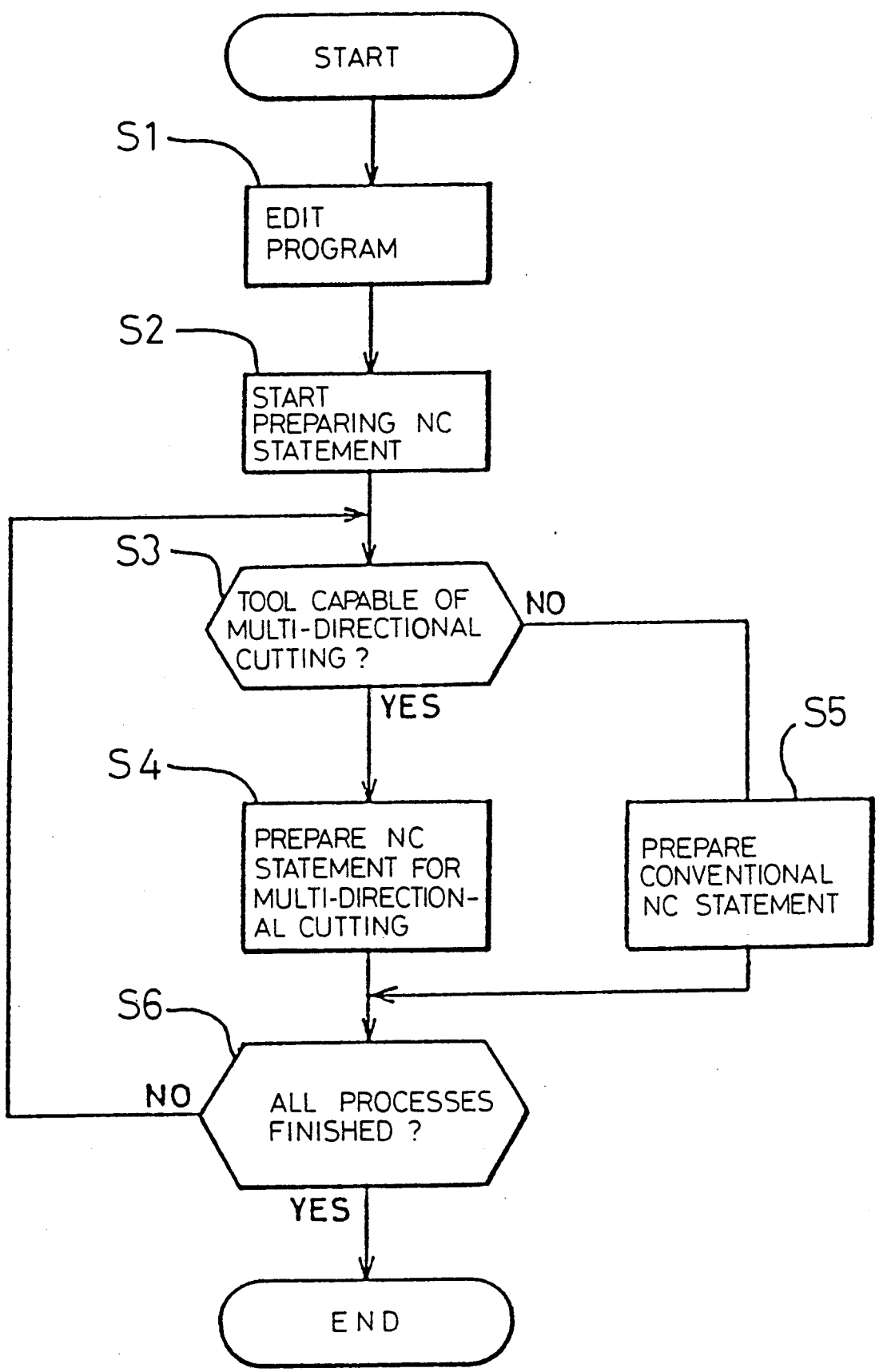
FIG. 2 is a flow chart showing a processing of a numerical control device according to the present invention.

FIG. 2 is a flow chart showing a processing of a numerical control device according to the present invention. In FIG. 2, the numerals prefixed with a symbol S are step numbers.

[S1] The program is edited. Here, it is specified whether the tool is a one-way cutting tool or a tool capable of multi-directional cutting, for each process.

[S2] The preparation of an NC statement is started. In an interactive numerical control device, the material and type of machining, etc. are graphically displayed on a screen, and a programmer prepares the NC statement by making a dialogical selection of these factors.

[S3] It is determined whether the tool is capable of multi-directional cutting. If the tool is capable of multi-directional cutting, the program proceeds to S4. If not, the program proceeds to S5.

[S4] As the tool is capable of multi-directional cutting, an NC statement for multi-directional cutting is prepared.

[S5] Since the tool is a usual tool, a conventional NC statement is prepared.

[S6] It is determined whether all of the processes are finished. If all the processes are not finished, the program proceeds to S3, and the processing is continued.

Thus, the NC statement for settling the machining passage is prepared depending on the type of tool. If the tool is capable of multi-directional cutting, the NC statement including the machining passage shown in FIG. 1 is prepared.

FIG. 3 shows an arrangement of the hardware of the numerical control device (CNC) for effecting the present invention. In FIG. 3, numeral 11 denotes a processor for global control; 12, a ROM storing a control program; 13, a RAM storing various data; 14, a nonvolatile memory, such as a bubble memory, stored with a machining program, parameters, etc.; and 14a a machining program.

Numeral 15 denotes a PMC (programmable machine controller), which receives commands for an M function and T function, etc., and converts these commands into output signals for controlling a machine tool. A T code or the like for the selection of the tool is also delivered to the PMC (programmable machine controller) 15, processed by a sequence program 15a of the PMC 15, and then output from an input/output circuit to a control circuit on the machine side. Numeral 16 denotes a display control circuit, which converts digital signals into display signals; 16a denotes a display device, such as a CRT or a liquid-crystal display device; and 17 denotes a keyboard used to input various data.

Numeral 18 denotes a position control circuit for controlling a servomotor; 19, a servo amplifier for the speed control of the servomotor; 20, the servomotor; 21, a tachometer generator for speed feedback; and 22, a position detector, such as a pulse coder or an optical scale. Although the number of elements used corresponds to the number of axes, only those for one axis are described herein.

Numeral 23 denotes the input/output circuit for transmitting and receiving digital signals to and from the outside. A tool select signal (T signal) for controlling the tool replacement is also output from the circuit 23 to the machine-side control circuit. Numeral 24 denotes a manual pulse generator for digitally moving the individual axes.

According to the present invention, as described above, an NC statement including the machining passage for exclusive use is prepared for a tool capable of multi-directional cutting, so that the machining time is reduced and the NC statement is shortened.

We claim:

1. An NC statement preparing system of an interactive numerical control device comprising:
    means for preparing an interactive program;
    discriminating means for determining whether a tool is a one-way cutting tool or a tool capable of multi-directional cutting; and
    NC statement preparing means for preparing an NC statement by choosing between an NC statement for tool passage for the one-way cutting tool and an NC statement for tool passage for the multi-directional cutting in response to the determining by said discriminating means.

2. An NC statement preparing system according to claim 1, wherein said tool is a turning tool.

* * * * *